(12) United States Patent
Kwon et al.

(10) Patent No.: US 10,385,944 B2
(45) Date of Patent: Aug. 20, 2019

(54) PLANETARY GEAR TRAIN OF AUTOMATIC TRANSMISSION FOR VEHICLES

(71) Applicants: HYUNDAI MOTOR COMPANY, Seoul (KR); KIA MOTORS CORPORATION, Seoul (KR)

(72) Inventors: Hyun Sik Kwon, Seoul (KR); Seongwook Ji, Gunpo-si (KR); Ki Tae Kim, Incheon (KR); Juhyeon Park, Suwon-si (KR); Ilhan Yoo, Seongnam-si (KR); Seong Wook Hwang, Gunpo-si (KR); Wonmin Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 6 days.

(21) Appl. No.: 15/833,946

(22) Filed: Dec. 6, 2017

(65) Prior Publication Data
US 2019/0078658 A1    Mar. 14, 2019

(30) Foreign Application Priority Data
Sep. 12, 2017 (KR) .......................... 10-2017-0116710

(51) Int. Cl.
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/0069* (2013.01); *F16H 2200/2012* (2013.01); *F16H 2200/2046* (2013.01)

(58) Field of Classification Search
CPC ........ F16H 3/44; F16H 3/66; F16H 2003/005; F16H 2200/2012; F16H 2200/2041; F16H 2200/2046; F16H 2037/047; F16H 2037/048
See application file for complete search history.

(56) References Cited

U.S. PATENT DOCUMENTS

2016/0053869 A1* 2/2016 Beck .................... F16H 3/66
475/275

* cited by examiner

*Primary Examiner* — Mark J Beauchaine
(74) *Attorney, Agent, or Firm* — Knobbe Martens Olson & Bear LLP

(57) ABSTRACT

A planetary gear train of an automatic transmission is disclosed. The planetary gear train comprises four planetary gear sets each including three rotation elements. The planetary gear train further comprises five shafts connecting at least one rotation member that are fixedly or operably connecting at least one rotation member to at least one from an input shaft of the transmission, an output shaft of the transmission, and the another rotation member of another planetary gear sets.

9 Claims, 2 Drawing Sheets

FIG. 2

| Speed stages | Engaging elements | | | | | | Gear ratio |
|---|---|---|---|---|---|---|---|
| | C1 | C2 | C3 | C4 | B1 | B2 | |
| D1 |  | ● |  |  | ● | ● | 5.600 |
| D2 |  | ● |  | ● | ● |  | 3.143 |
| D3 |  | ● | ● |  | ● |  | 2.301 |
| D4 | ● | ● |  |  | ● |  | 1.709 |
| D5 | ● |  | ● |  | ● |  | 1.449 |
| D6 | ● |  |  | ● | ● |  | 1.079 |
| D7 | ● | ● |  | ● |  |  | 1.000 |
| D8 | ● |  |  | ● |  | ● | 0.889 |
| D9 | ● |  | ● |  |  | ● | 0.655 |
| D10 | ● | ● |  |  |  | ● | 0.586 |
| REV |  | ● |  | ● |  | ● | -2.000 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2017-0116710 filed in the Korean Intellectual Property Office on Sep. 12, 2017, the entire contents of which are incorporated herein by reference.

BACKGROUND (a) Field

The present disclosure relates to an automatic transmission for a vehicle. More particularly, the present disclosure relates to a planetary gear train of an automatic transmission for a vehicle that improves power delivery performance and fuel economy by achieving ten forward speed stages with a minimum number of constituent elements being used and improves silent driving of the vehicle by using operation point positioned at a low engine speed.

(b) Description of Related Art

Generally, an automatic transmission achieving more speed stages has been developed to enhancing fuel economy and optimizing drivability. Recently, increase of oil price is triggering a hard competition in enhancing fuel consumption of a vehicle.

Therefore, many researches for reducing weight and enhancing fuel economy through downsizing of an engine and for securing drivability and fuel economy through multiple speed stages of automatic transmissions have been developed.

However, in the automatic transmission, as the number of speed stages increase, the number of internal components (particularly, planetary gear sets) increase, and as a result, a length of the transmission increases. Therefore, mountability, cost, weight, transmission efficiency, and the like may still deteriorate.

Accordingly, development of a planetary gear train which may achieve maximum efficiency with a small number of components may be important in order to increase a fuel economy enhancement effect through the multiple-speeds.

The above information disclosed in this Background section is only for enhancement of understanding of background of the invention. Applicant notes that this section may contain information available before this application. However, by providing this section, Applicant does not admit that any information contained in this section constitutes prior art.

SUMMARY

In a related art, 8-speed automatic transmissions were implemented and the research and development of a planetary gear train capable of implementing more speed stages has also been actively conducted.

However, an 8-speed automatic transmission typically includes three to four planetary gear sets and five to seven control elements (frictional elements). In this case, since the length of the automatic transmission increases, mountability may be deteriorated.

It is possible to dispose one planetary gear set above another planetary gear set to form a parallel planetary gear set, but structures of automatic transmissions including such parallel planetary gear set is applied are very limited.

The present disclosure has been made in an effort to provide a planetary gear train of an automatic transmission for a vehicle having advantages of improving power delivery performance and fuel economy by achieving at least ten forward speed stages and four reverse speed stages.

A planetary gear train of an automatic transmission for a vehicle according to embodiments of the present invention may include an input shaft receiving torque of an engine, an output shaft outputting torque, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotational elements, a first shaft fixedly connected with the fifth rotation element and selectively connected with the input shaft, a second shaft fixedly connected with the seventh rotation element and selectively connected with the input shaft, a third shaft fixedly connected with the twelfth rotation element and fixedly connected with the output shaft, a fourth shaft fixedly connected with the third rotation element and the eighth rotation element, a fifth shaft fixedly connected with the ninth rotation element and the tenth rotation element and a plurality of shafts, each of which is selectively connected to the transmission housing and fixedly connected to a rotation element of the first, second and fourth planetary gear sets that is not fixedly connected with any of the first to fifth shafts.

The plurality of shaft may include a sixth shaft fixedly connected with the first rotation element and the fourth rotation element and selectively connected with the transmission housing and a seventh shaft fixedly connected with the second rotation element, the sixth rotation element and the eleventh rotation element and selectively connected with the transmission housing and wherein the input shaft may be selectively connected with the first shaft, the input shaft may be selectively connected with the second shaft, the second shaft may be selectively connected with the seventh shaft, and the fourth shaft may be selectively connected with the fifth shaft.

The planetary gear train of claim may further include four clutches selectively connecting two shafts among the input shaft and the first to the seventh shaft and two brakes selectively connecting the sixth shaft and the seventh shaft to the transmission housing respectively.

The four clutches may include a first clutch disposed between the input shaft and the first shaft, a second clutch disposed between the input shaft and the second shaft, a third clutch disposed between the second shaft and the seventh shaft and a fourth clutch disposed between the fourth shaft and the fifth shaft and the two brakes may include a first brake disposed between the sixth shaft and the transmission housing and a second brake disposed between the seventh shaft and the transmission housing.

The first planetary gear set may be a single pinion planetary gear set, the first rotational element is a first sun gear, the second rotational element is a first planet carrier, and the third rotational element is a first ring gear, the second planetary gear set may be a single pinion planetary gear set, the fourth rotational element is a second sun gear, the fifth rotational element is a second planet carrier, and the sixth rotational element is a second ring gear, the third planetary gear set may be a single pinion planetary gear set, the seventh rotational element is a third sun gear, the eighth rotational element is a third planet carrier, and the ninth rotational element is a third ring gear and the fourth planetary gear set may be a single pinion planetary gear set, the tenth rotational element is a fourth sun gear, the eleventh rotational element is a fourth planet carrier, and the twelfth rotational element is a fourth ring gear.

A planetary gear train of an automatic transmission for a vehicle according to embodiments of the present invention may include an input shaft receiving torque of an engine, an output shaft outputting torque, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotational elements and the first rotation element may be fixedly connected with the fourth rotation element and is selectively connected with a transmission housing, and the second rotation element may be fixedly connected with the sixth rotation element and the eleventh rotation element and may be selectively connected with the transmission housing, the third rotation element may be fixedly connected with the eighth rotation element, the fifth rotation element may be selectively connected with the input shaft, the seventh rotation element may be selectively connected with the input shaft and may be selectively connected with the sixth rotation element, the ninth rotation element may be fixedly connected with the tenth rotation element and may be selectively connected with the eighth rotation element and the twelfth rotation element may be fixedly connected with the output shaft.

The planetary gear train may further include four clutches selectively connecting two rotational elements among the input shaft and the first to the twelfth rotation elements and two brakes selectively connecting the first rotational element and the second rotational element to the transmission housing, respectively.

The four clutches may include a first clutch disposed between the input shaft and the fifth rotation element, a second clutch disposed between the input shaft and the seventh rotation element, a third clutch disposed between the sixth rotation element and the seventh rotation element and a fourth clutch disposed between the eighth rotation element and the ninth rotation element and the two brakes may include a first brake disposed between the first rotation element and transmission housing and a second brake disposed between the second rotation element and transmission housing.

The first planetary gear set may be a single pinion planetary gear set, the first rotational element is a first sun gear, the second rotational element is a first planet carrier, and the third rotational element is a first ring gear, the second planetary gear set may be a single pinion planetary gear set, the fourth rotational element is a second sun gear, the fifth rotational element is a second planet carrier, and the sixth rotational element is a second ring gear, the third planetary gear set may be a single pinion planetary gear set, the seventh rotational element is a third sun gear, the eighth rotational element is a third planet carrier, and the ninth rotational element is a third ring gear and the fourth planetary gear set may be a single pinion planetary gear set, the tenth rotational element is a fourth sun gear, the eleventh rotational element is a fourth planet carrier, and the twelfth rotational element is a fourth ring gear.

The planetary gear train according to embodiments of the present invention may achieve ten forward speed stages and one reverse speed stages by combining four planetary gear sets being simple planetary gear sets with six control elements.

In addition, the planetary gear train according to embodiments of the present invention may achieve speed stages suitable to a rotational speed of the engine due to multiple-speed stages of the automatic transmission. Particularly, silent driving of the vehicle may be improved by using operation point positioned at a low rotational speed region of an engine. In addition, the planetary gear train according to embodiments of the present invention may maximize driving efficiency of the engine and may improve power delivery performance and fuel consumption.

Other effects obtainable or predictable from embodiments of the present invention will be explicitly or implicitly described in a DETAILED DESCRIPTION section. That is, various effects predictable from embodiments of the present invention will be described in the DETAILED DESCRIPTION section.

BRIEF DESCRIPTION OF THE DRAWINGS

FIG. 2 is an operation chart of control elements at each speed stage in the planetary gear train according to embodiments of the present invention.

DESCRIPTION OF SYMBOLS

Figure 1:
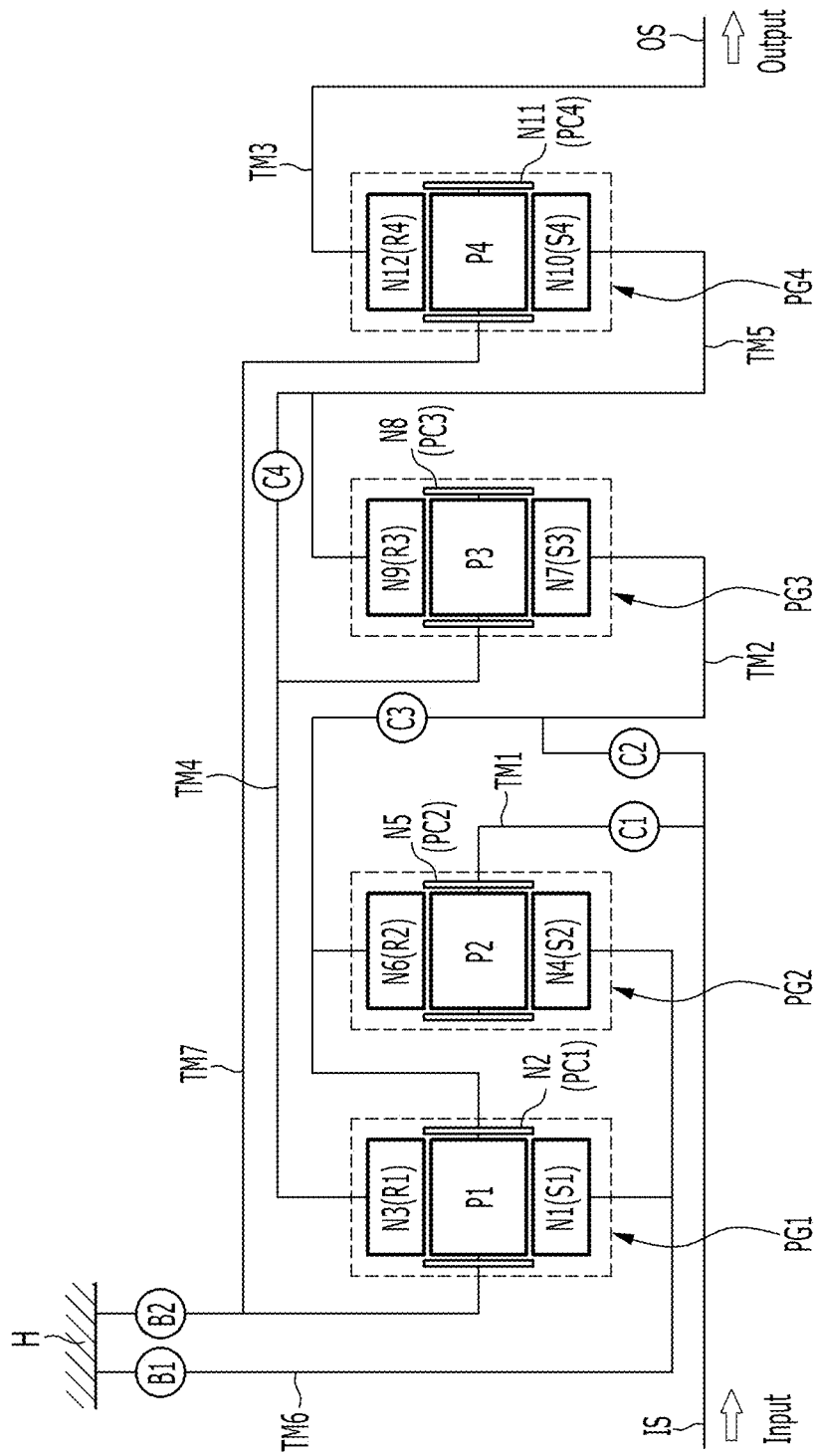
FIG. 1 is a schematic diagram of a planetary gear train according to embodiments of the present invention.

B1,B2 . . . first, second brake
C1,C2,C3,C4 . . . first, second, third, fourth clutch
PG1,PG2,PG3,PG4 . . . first, second, third, fourth planetary gear set
S1,S2,S3,S4 . . . first, second, third, fourth sun gear
PC1,PC2,PC3,PC4 . . . first, second, third, fourth planet carrier
R1,R2,R3,R4 . . . first, second, third, fourth ring gear
IS . . . input shaft
OS . . . output shaft
TM1,TM2,TM3,TM4,TM5,TM6,TM7 . . . first, second, third, fourth, fifth, sixth, seventh shaft

DETAILED DESCRIPTION

Hereinafter, embodiments of the present invention will be described in detail with reference to the accompanying drawings.

However, parts which are not related with the description are omitted for clearly describing embodiments of the present invention and like reference numerals refer to like or similar elements throughout the specification.

In the following description, dividing names of components into first, second, and the like is to divide the names because the names of the components are the same as each other and an order thereof is not particularly limited.

In embodiments, when two members (elements) are fixedly connected with a shaft, the two members move together and rotate about a rotational axis at the same angular speed. In embodiments, when a member is fixedly connected to a transmission housing, the member is fixed to the transmission housing and does not rotate about a rotational axis of the transmission. In embodiments, when two members are fixedly connected to each other and when one of the two members is fixedly connected to a transmission housing, the two fixedly connected members are fixed to the transmission housing and do not rotate about a rotational axis of the transmission. In embodiments, the term "fixedly connected" is interchangeable with the term "fixed to". In embodiments, when two members are "selectively connected", the two members are operable (1) to engage (fixedly connected) each other to move/rotate together for an operation of the transmission or (2) not to engage each other and to move independently for another operation of the transmission. In embodiment, the term "selectively connected" is interchangeable with the term "operably connected to connect or to disconnect". In embodiments, when a member is engaged to a transmission housing, the member is fixed to the transmission housing and accordingly does not rotate about a rotational axis of a transmission.

In embodiments, when a clutch operates, the clutch engages two rotatable members corresponding to the clutch such that the members rotate together at the same angular speed.

In embodiments, when a brake fully operates between a rotational member and a fixed housing, the brake holds the rotational member such that the rotational member does not move or rotate relative to the fixed housing.

FIG. 1 is a schematic diagram of a planetary gear train according to embodiments of the present invention.

Referring to FIG. 1, a planetary gear train according to embodiments of the present invention includes first, second, third, and fourth planetary gear sets PG1, PG2, PG3, and PG4 disposed on the same axis, an input shaft IS, an output shaft OS, seven rotation shafts TM1 to TM7 connected to at least one of rotation elements of the first, second, third, and fourth planetary gear sets PG1, PG2, PG3, and PG4, four clutches C1 to C4 and two brakes B1, and B2 that are control elements, and a transmission housing H.

Torque input from the input shaft IS is changed by cooperation of the first, second, third, and fourth planetary gear sets PG1, PG2, PG3, and PG4 and the changed torque is output through the output shaft OS.

The planetary gear sets are disposed in the order of the first, second, third, and fourth planetary gear sets PG1, PG2, PG3 and PG4 from an engine side.

The input shaft IS is an input member and the torque from a crankshaft of an engine, after being torque-converted through a torque converter, is input into the input shaft IS.

The output shaft OS is an output member, is disposed in parallel with the input shaft IS, and transmits driving torque to a driving wheel through a differential apparatus. The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

The first rotation element N1 is fixedly connected with the fourth rotation element N4, the second rotation element N2 is fixedly connected with the sixth rotation element N6 and the eleventh rotation element N11, the third rotation element N3 is fixedly connected with the eighth rotation element N8 and the ninth rotation element N9 is fixedly connected with the tenth rotation element N10, such that the first, the second, the third and the fourth planetary gear sets PG1, PG2, PG3 and PG4 include seven shafts TM1 to TM7.

The seven shafts TM1 to TM7 will be described in further detail.

The first shaft TM1 is fixedly connected with the fifth rotation element N5 (the second planet carrier PC2) and selectively connected with the input shaft IS thereby selectively acting as an input element.

The second shaft TM2 is fixedly connected with the seventh rotation element N7 (the third sun gear S3) and selectively connected with the input shaft IS thereby selectively acting as an input element.

The third shaft TM3 is fixedly connected with the twelfth rotation element N12 (the fourth ring gear R4) and fixedly connected with the output shaft OS thereby acting as an output element.

The fourth shaft TM4 is fixedly connected with third rotation element N3 (the first ring gear R1) and the eighth rotation element N8 (the third planet carrier PC3).

The fifth shaft TM5 is fixedly connected with the ninth rotation element N9 (the third ring gear R3) and the tenth rotation element N10 (the fourth sun gear S4).

The sixth shaft TM6 is fixedly connected with the first rotation element N1 (the first sun gear S1) and the fourth rotation element N4 (the second sun gear S2).

The seventh shaft TM7 is fixedly connected with the second rotation element N2 (the second planet carrier PC2), the sixth rotation element N6 (the second ring gear R2) and the eleventh rotation element N11 (the fourth planet carrier PC4).

The seven shafts TM1 to TM7 may be rotation members that directly connect a plurality of rotational elements among the rotational elements of the planetary gear sets PG1, PG2, PG3, and PG4 with each other or that are directly connected to any one rotation element of the planetary gear sets PG1, PG2, PG3, and PG4 and rotate with the any one rotation element to transmit torque, or may be fixed members that selectively or directly connect any one rotation element of the planetary gear sets PG1, PG2, PG3, and PG4 to the transmission housing H to fix the any one rotation element.

In the disclosure, in the above description, the term "fixedly connected", "directly connected" or similar term means that a plurality of rotational elements including the input and output shafts, which are connected through the corresponding shafts, and the corresponding shaft are connected so as to rotate without any difference in the number of revolutions. That is, a plurality of fixedly connected rotational elements and corresponding shafts rotate in the same rotation direction and number of revolutions.

In addition, in the above description, the term "selectively connected" or similar terms means that a plurality of shafts, including an input and output shafts, are connected to each other so as to be rotatable in the same rotation direction and number of revolutions through engagement elements, or the corresponding shaft is fixedly connected to the transmission housing via the engagement element.

That is, when the engagement element operates to selectively connect a plurality of the shafts, the plurality of the shafts rotate in the same rotation direction and number of revolutions. Conversely, when the engagement element is released, the connection of the plurality of the shafts is released.

Further, when the engagement element operates to selectively connect the corresponding shaft and the transmission housing, the corresponding shaft is fixedly connected to the transmission housing. Conversely, when the engagement element is released, the corresponding shaft is in a rotatable state.

In this case, the first shaft TM1 is selectively connected with the input shaft IS, the second shaft TM2 is selectively connected with the input shaft IS, the second shaft TM2 is selectively connected with the seventh shaft TM7, and the fourth shaft TM4 is selectively connected with the fifth shaft TM5.

In addition, the sixth shaft TM6 and the seventh shaft TM7 are selectively connected with the transmission housing H thereby selectively acting as a fixed element.

The seven shafts TM1 to TM7, the input shaft IS, and the output shaft OS may be selectively interconnected with one another by engagement elements of four clutches C1, C2, C3, and C4.

The seven shafts TM1 to TM7 may be selectively connected with the transmission housing H, by engagement elements of two brakes B1 and B2.

The six engagement element of the four clutches C1 to C4 and the two brakes B1 and B2 are arranged as follows.

The first clutch C1 is arranged between the input shaft IS and the first shaft TM1, and selectively connects the input shaft IS and the first shaft TM1, thereby controlling power delivery therebetween.

The second clutch C2 is disposed between the input shaft IS and the second shaft TM2 and selectively connects the input shaft IS and the second shaft TM2.

The third clutch C3 is disposed between the second shaft TM2 and the seventh shaft TM7 and selectively connects second shaft TM2 and the seventh shaft TM7.

The fourth clutch C4 is disposed between the fourth shaft TM4 and the fifth shaft TM5 and selectively connects fourth shaft TM4 and the fifth shaft TM5.

The first brake B1 is disposed between the sixth shaft TM6 and the transmission housing H and selectively connects the sixth shaft TM6 to the transmission housing H.

The second brake B2 is disposed between the seventh shaft TM7 and the transmission housing and selectively connects the seventh shaft TM7 to the transmission housing H.

The control elements including the first, the second, the third, and the fourth clutches C1, C2, C3, and C4 and the first, second and third brakes B1, B2 and B3 may be frictionally engaging units that are operated by hydraulic pressure. Particularly, the control elements may be, but not limited to, multi-plates friction elements of wet type. However, the control elements may be engaging units that are operated by electrical signal, such as dog clutches, electric clutches, magnetic particle clutches, etc.

FIG. 2 is an operation chart of control elements at each speed stage in the planetary gear train according to embodiments of the present invention.

In embodiments, referring to FIG. 2, the ratios of gear ratios of two sequential driving gears $D_n/D_{n+1}$ (n=1, 2, 3, . . . 10) are about 1.782 (=5.6/3.143), 1.366(=3.143/2.301), 1.346, 1.179, 1.343, 1.079, 1.125, 1.357, and 1.120 (=0.655/0.585). In embodiments, from the second forward speed shift-stage D2 to the tenth forward speed shift-stage D10, ratios of gear ratios of two sequential driving gears are in a range of about 1.079 and 1.366.

As shown in FIG. 2, three control elements among the first, the second, the third, and the fourth clutches C1, C2, C3, and C4 and the first and the second brakes B1 and B2 that are control elements are operated at each speed stage in the planetary gear train according to embodiments of the present invention.

The second clutch C2 and the first and second brakes B1 and B2 are simultaneously operated at a first forward speed shift-stage D1.

In a state that the second shaft TM2 is connected with the input shaft IS by operation of the second clutch C2, torque of the input shaft IS is input to the second shaft TM2.

In addition, the sixth and seventh shafts TM6 and TM7 are operated as the fixed elements by operation of the first and the second brakes B1 and B2 respectively. Therefore, the torque of the input shaft IS is shifted into the first forward speed stage, and the first forward speed stage is output through the output shaft OS connected to the third shaft TM3.

The second and fourth clutches C2 and C4 and the first brake B1 are simultaneously at a second forward speed shift-stage D2.

In a state that the second shaft TM2 is connected with the input shaft IS by operation of the second clutch C2 and the fourth shaft TM4 is connected with the fifth shaft TM5 by operation of the fourth clutch C4, torque of the input shaft IS is input to the second shaft TM2.

In addition, the sixth shaft TM6 is operated as the fixed element by operation of the first brake B1. Therefore, the torque of the input shaft IS is shifted into the second forward speed stage, and the second forward speed stage is output through the output shaft OS connected to the third shaft TM3.

The second and the third clutches C2 and C3 and the first brake B1 are simultaneously operated at a third forward speed shift-stage D3.

In a state that the second shaft TM2 is connected with the input shaft IS by operation of the second clutch C2 and the second shaft TM2 is connected with the seventh shaft TM7 by operation of the third clutch C3, torque of the input shaft IS is input to second shaft TM2.

In addition, the sixth shaft TM6 is operated as the fixed element by operation of the first brake B1. Therefore, the torque of the input shaft IS is shifted into the third forward speed stage, and the third forward speed stage is output through the output shaft OS connected to the third shaft TM3.

The first and second clutches C1 and C2 and the first brake B1 are simultaneously at a fourth forward speed shift-stage D4.

In a state that the first shaft TM1 is connected with the input shaft IS by operation of the first clutch C1 and the second shaft TM2 is connected with the input shaft IS by operation of second clutch C2, torque of the input shaft IS is input to the first shaft TM1 and the second shaft TM2.

In addition, the sixth shaft TM6 is operated as the fixed element by operation of the first brake B1. Therefore, the torque of the input shaft IS is shifted into the fourth forward speed stage, and the fourth forward speed stage is output through the output shaft OS connected to the third shaft TM3.

The first and third clutches C1 and C3 and the first brake B1 are simultaneously operated at a fifth forward speed shift-stage D5.

In a state that the first shaft TM1 is connected with the input shaft IS by operation of the first clutch C1 and the second shaft TM2 is connected with the seventh shaft TM7 by operation of the third clutch C3, torque of the input shaft IS is input to the first shaft TM1.

In addition, the sixth shaft TM6 is operated as the fixed element by operation of the first brake B1. Therefore, the torque of the input shaft IS is shifted into the fifth forward speed stage, and the fifth forward speed stage is output through the output shaft OS connected to the third shaft TM3.

The first and fourth clutches C1 and C4 and the first brake B1 are simultaneously operated at a sixth forward speed shift-stage D6.

In a state that the first shaft TM1 is connected with the input shaft IS by operation of the first clutch C1 and the fourth shaft TM4 is connected with the fifth shaft TM5 by operation of the fourth clutch C4, torque of the input shaft IS is input to the first shaft TM1.

In addition, the sixth shaft TM6 is operated as the fixed element by operation of the first brake B1. Therefore, the torque of the input shaft IS is shifted into the sixth forward speed stage, and the sixth forward speed stage is output through the output shaft OS connected to the third shaft TM3.

The first, second, and fourth clutches C1, C2, and C4 are simultaneously operated at a seventh forward speed shift-stage D7.

In this state, the first shaft TM1 is connected with the input shaft IS by operation of the first clutch C1, the second shaft TM2 is connected with the input shaft IS by operation of second clutch C2 and the fourth shaft TM4 is connected with the fifth shaft TM5 by operation of the fourth clutch C4.

Then, the first, second, third, and fourth planetary gear sets PG1, PG2, PG3, and PG4 integrally rotate, and the torque received at the first shaft TM1 and the second shaft TM2 is outputted as inputted, thereby realizing the seventh forward speed and outputting a shifted torque through the output shaft OS connected with the third shaft TM3.

The first and fourth clutches C1 and C4 and the second brake B2 are simultaneously operated at a eighth forward speed shift-stage D8.

In a state that the first shaft TM1 is connected with the input shaft IS by operation of the first clutch C1 and the fourth shaft TM4 is connected with the fifth shaft TM5 by operation of the fourth clutch C4, torque of the input shaft IS is input to the first shaft TM1.

In addition, the seventh shaft TM7 is operated as the fixed element by operation of the second brake B2. Therefore, the torque of the input shaft IS is shifted into the eighth forward speed stage, and the eighth forward speed stage is output through the output shaft OS connected to the third shaft TM3.

The first and third clutches C1 and C3 and the second brake B2 are simultaneously operated at a ninth forward speed shift-stage D9.

In a state that the first shaft TM1 is connected with the input shaft IS by operation of the first clutch C1 and the second shaft TM2 is connected with the seventh shaft TM7 by operation of the third clutch C3, torque of the input shaft IS is input to the first shaft TM1.

In addition, the seventh shaft TM7 is operated as the fixed element by operation of the second brake B2. Therefore, the torque of the input shaft IS is shifted into the ninth forward speed stage, and the ninth forward speed stage is output through the output shaft OS connected to the third shaft TM3.

The first and second clutches C1 and C2 and the second brake B2 are simultaneously operated at a tenth forward speed shift-stage D10.

In a state that the first shaft TM1 is connected with the input shaft IS by operation of the first clutch C1 and the second shaft TM2 is connected with the input shaft IS by operation of second clutch C2, torque of the input shaft IS is input to the first shaft TM1 and the second shaft TM2.

In addition, the seventh shaft TM7 is operated as the fixed element by operation of the second brake B2. Therefore, the torque of the input shaft IS is shifted into the tenth forward speed stage, and the tenth forward speed stage is output through the output shaft OS connected to the third shaft TM3.

The second and fourth clutches C2 and C4 and the second brake B2 are simultaneously operated at a reverse speed shift-stage REV.

In a state that the second shaft TM2 is connected with the input shaft IS by operation of second clutch C2 and the fourth shaft TM4 is connected with the fifth shaft TM5 by operation of the fourth clutch C4, torque of the input shaft IS is input to the second shaft TM2.

In addition, the seventh shaft TM7 is operated as the fixed element by operation of the second brake B2. Therefore, the torque of the input shaft IS is shifted into the reverse speed stage, and the reverse speed stage is output through the output shaft OS connected to the third shaft TM3 as inverse rotation speed.

The planetary gear trains according to embodiments of the present invention may achieve at least ten forward speed stages and one reverse speed stages by combining four planetary gear sets PG1, PG2, PG3, and PG4 with the four clutches C1, C2, C3, and C4 and the two brakes B1 and B2.

In addition, the planetary gear train according to embodiments of the present invention may achieve suitable speed stages according to rotation speed of the engine. Particularly, silent driving of the vehicle may be improved by using operation point positioned at a low rotational speed region of the engine.

In addition, the planetary gear train according to embodiments of the present invention may maximize driving efficiency of the engine and may improve power delivery performance and fuel consumption.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle comprising:
   an input shaft receiving torque of an engine;
   an output shaft outputting torque;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set having tenth, eleventh, and twelfth rotational elements;
   a first shaft fixedly connected with the fifth rotation element and selectively connected with the input shaft;
   a second shaft fixedly connected with the seventh rotation element and selectively connected with the input shaft;
   a third shaft fixedly connected with the twelfth rotation element and fixedly connected with the output shaft;

a fourth shaft fixedly connected with the third rotation element and the eighth rotation element;
a fifth shaft fixedly connected with the ninth rotation element and the tenth rotation element; and
a plurality of shafts, each of which is selectively connected to the transmission housing, wherein at least one of the plurality of shafts is fixedly connected to a rotation element of the first, second and fourth planetary gear sets that is not fixedly connected with any of the first to fifth shafts.

2. The planetary gear train of claim 1, wherein the plurality of shafts comprise:
a sixth shaft fixedly connected with the first rotation element and the fourth rotation element and selectively connected with the transmission housing; and
a seventh shaft fixedly connected with the second rotation element, the sixth rotation element and the eleventh rotation element and selectively connected with the transmission housing; and
wherein the input shaft is selectively connected with the first shaft, the input shaft is selectively connected with the second shaft, the second shaft is selectively connected with the seventh shaft, and the fourth shaft is selectively connected with the fifth shaft.

3. The planetary gear train of claim 2, further comprises:
four clutches selectively connecting two shafts among the input shaft and the first to the seventh shaft; and
two brakes selectively connecting the sixth shaft and the seventh shaft to the transmission housing respectively.

4. The planetary gear train of claim 3, wherein:
the four clutches comprises:
a first clutch disposed between the input shaft and the first shaft;
a second clutch disposed between the input shaft and the second shaft;
a third clutch disposed between the second shaft and the seventh shaft; and
a fourth clutch disposed between the fourth shaft and the fifth shaft; and
wherein the two brakes comprises:
a first brake disposed between the sixth shaft and the transmission housing; and
a second brake disposed between the seventh shaft and the transmission housing.

5. The planetary gear train of claim 1, wherein:
the first planetary gear set is a single pinion planetary gear set, the first rotational element is a first sun gear, the second rotational element is a first planet carrier, and the third rotational element is a first ring gear;
the second planetary gear set is a single pinion planetary gear set, the fourth rotational element is a second sun gear, the fifth rotational element is a second planet carrier, and the sixth rotational element is a second ring gear;
the third planetary gear set is a single pinion planetary gear set, the seventh rotational element is a third sun gear, the eighth rotational element is a third planet carrier, and the ninth rotational element is a third ring gear; and
the fourth planetary gear set is a single pinion planetary gear set, the tenth rotational element is a fourth sun gear, the eleventh rotational element is a fourth planet carrier, and the twelfth rotational element is a fourth ring gear.

6. A planetary gear train of an automatic transmission for a vehicle comprising:
an input shaft receiving torque of an engine;
an output shaft outputting torque;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotational elements; and
wherein the first rotation element is fixedly connected with the fourth rotation element and is selectively connected with a transmission housing;
the second rotation element is fixedly connected with the sixth rotation element and the eleventh rotation element and is selectively connected with the transmission housing;
the third rotation element is fixedly connected with the eighth rotation element;
the fifth rotation element is selectively connected with the input shaft;
the seventh rotation element is selectively connected with the input shaft and is selectively connected with the sixth rotation element;
the ninth rotation element is fixedly connected with the tenth rotation element and is selectively connected with the eighth rotation element; and
the twelfth rotation element is fixedly connected with the output shaft.

7. The planetary gear train of claim 6, further comprises:
four clutches selectively connecting two rotational elements among the input shaft and the first to the twelfth rotation elements; and
two brakes selectively connecting the first rotational element and the second rotational element to the transmission housing, respectively.

8. The planetary gear train of claim 7, wherein:
the four clutches comprise:
a first clutch disposed between the input shaft and the fifth rotation element;
a second clutch disposed between the input shaft and the seventh rotation element;
a third clutch disposed between the sixth rotation element and the seventh rotation element; and
a fourth clutch disposed between the eighth rotation element and the ninth rotation element; and
wherein the two brakes comprise:
a first brake disposed between the first rotation element and transmission housing; and
a second brake disposed between the second rotation element and transmission housing.

9. The planetary gear train of claim 6, wherein:
the first planetary gear set is a single pinion planetary gear set, the first rotational element is a first sun gear, the second rotational element is a first planet carrier, and the third rotational element is a first ring gear;
the second planetary gear set is a single pinion planetary gear set, the fourth rotational element is a second sun gear, the fifth rotational element is a second planet carrier, and the sixth rotational element is a second ring gear;
the third planetary gear set is a single pinion planetary gear set, the seventh rotational element is a third sun gear, the eighth rotational element is a third planet carrier, and the ninth rotational element is a third ring gear; and
the fourth planetary gear set is a single pinion planetary gear set, the tenth rotational element is a fourth sun gear, the eleventh rotational element is a fourth planet carrier, and the twelfth rotational element is a fourth ring gear.

\* \* \* \* \*